United States Patent [19]

Pasiuk

[11] 3,930,085

[45] Dec. 30, 1975

[54] PREPARATION OF THERMAL BARRIERS

[75] Inventor: Walter T. Pasiuk, Tulsa, Okla.

[73] Assignee: The United States of America as represented by the Secretary of the Army, Washington, D.C.

[22] Filed: Feb. 13, 1975

[21] Appl. No.: 549,574

[52] U.S. Cl. .................... 428/116; 156/3; 156/286; 156/331; 427/244; 427/307; 427/379; 427/430; 428/312; 428/317; 428/322; 428/333
[51] Int. Cl.$^2$ ...................... B29C 17/00; B32B 3/12
[58] Field of Search ........ 156/3, 286, 331; 427/244, 427/307, 379, 430; 428/116, 312, 317, 322, 333

[56] References Cited
UNITED STATES PATENTS

| | | | |
|---|---|---|---|
| 3,235,441 | 2/1966 | George et al. | 428/312 X |
| 3,513,051 | 5/1970 | Lichfield | 156/287 X |
| 3,553,054 | 1/1971 | Maus | 156/286 X |
| 3,703,422 | 11/1972 | Yoshino | 156/286 X |

Primary Examiner—William A. Powell
Attorney, Agent, or Firm—Nathan Edelberg; Robert P. Gibson; Jack W. Voigt

[57] ABSTRACT

Method is disclosed for preparation of a thermal barrier for a polyimide substrate. The thermal barrier meets the requirements of withstanding a front surface exposure temperature of 3,000°F for 90 seconds without permitting a rear surface temperature of above 700°F. The thermal barrier structure has a honeycomb core or a foamed ceramic core that is coated with a zircon-silica composition which fills or coats the core. From one to four laminating layers of facing sheets of quartz fabric that is impregnated with a zircon-silica composition is employed to produce a reflective front facesheet. The rear surface of the thermal barrier is comprised of a layer of a glass-polyimide laminate which is attached using a polyimide or ceramic adhesive to form a back facesheet.

5 Claims, No Drawings

PREPARATION OF THERMAL BARRIERS

BACKGROUND OF THE DISCLOSURE

Space vehicles and rockets are subjected to extreme temperature and aerodynamic forces when traveling at high speeds through the atmosphere. To protect the components within the vehicles or rockets, insulation and other means for providing cooling have been provided. Ablative heat shields and coverings have been used. Ablative coverings which have included glassy materials in combination with organic materials have been used to provide a cooling effect to the substrate material which is the skin or outer enclosure for the space vehicle or rocket. The cooling effect is partially attributed to the boiling away of organic materials which results in charring to produce carbon, and subsequently, gaseous and particulate matter which flow outwardly from the space vehicle for rocket which is being subjected to extreme temperature and aerodynamic forces.

Exposure time and exposure temperature are variables which have to be considered along a minimum weight penalty for a thermal barrier, and of course, the material of construction of the substrate which the thermal barrier protects. A polyimide substrate imposes a temperature limitation of up to about 1000°F; however, for a higher reliability factor the normal restrictions indicate a temperature limitation of not over 700°F at the rear surface of the thermal barrier which is attached to the polyimide.

Since polyimide has many possible variations of structures due to the cross linking and formulation, only a typical example is shown which is derived from pyromellitic dianhydride and an aromatic diamine. The typical example has the following basic structural unit:

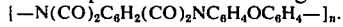

$[-N(CO)_2C_6H_2(CO)_2NC_6H_4OC_6H_4-]_n$.

Polyimide in addition to high temperature stability has additional beneficial properties which include: low electrical resistivity, resistance to abrasion and corrosion, excellent frictional characteristics, good wear resistance at high temperatures, resists radiation, exhibits low outgassing in high vacuum, maintains properties at cryogenic temperatures, low thermal expansion, high tensile strength, improved strength and flux resistance, and highly resistance to organic materials even at quite high temperatures. Processing is by machining, punching, powdered metal techniques since melting does not occur. Film can also be produced.

Because of the wide variety of excellent properties possessed by polyimide, polyimide is an excellent choice for use in space vehicles and rockets. It has to be protected, however, where the maximum exposure times and temperatures will be surpassed.

Therefore, an object of this invention to provide a method for preparing a thermal barrier which can withstand a front surface exposure temperature of 3000°F for at least 90 seconds and not produce a rear surface temperature above 700°F.

Another object of this invention is to provide a method for preparing a thermal barrier which utilizes either a honeycomb core or a ceramic foam core system, either of which can withstand a front surface exposure temperature of 3000°F for at least 90 seconds and not produce a rear surface temperature above 700°F.

SUMMARY OF THE INVENTION

The basic thermal barrier of this invention consists of ceramic-coated honeycomb core which is either filled or coated with a ceramic laminating or casting material (silica (10–43.8 percent by which and zircon 56.2–90 percent by weight). The coated honeycomb core is protected with a facing sheet. The facing sheet consists of one to four layers of quartz fabric impregnated with the ceramic laminating material (78.6 percent zircon and 21.4 percent silica). A back facesheet of quartz-polyimide laminate is attached on the rear surface of the core.

The method of this invention includes cleaning and etching the honeycomb and coating the honeycomb core with a casting mixed oxide coating material of about 90 percent zircon and about 10 percent silica. The actual coating is made by mixing by hand to achieve uniformity: 80 parts by weight of the casting oxide coating material, 15 parts by weight of sodium silicate (liquid glass), and 5 parts by weight water or sufficient water to yield proper viscosity to permit dipping and coating of the core. After the honeycomb core is dipped to achieve the desired coating (each successive dip results in a heavier coating on the core) the dipped core is air dried for a minimum of 16 hours. If a shaped honeycomb is desired, use shaped drying forms to which the honeycomb can be clamped. Apply high heat (400°–500°F) with a hot air gun rapidly to area to be shaped. Hold and clamp to drying forms. For a sharply contoured honeycomb, shape the honeycomb to forms prior to coating by cutting, grooving, splicing, etc., before applying the ceramic coating. Note that unshaped honeycomb is difficult to drape over the curing form. Curing is achieved in a hot air circulating oven at 150°F for 2 hours, 250°F for 2 hours, 350°F for 2 hours, and 400°F for 4 hours.

A laminating ceramic facesheet is applied to the oven cured honeycomb core by conventional wet lay-up techniques used in the plastic laminating industry. A wet ceramic slurry is applied to both sides of a high temperature resistant fabric such as quartz, silica, carbon, etc., rubbed into the fabric and excess wiped off. Additional plies of fabric are impregnated in the same manner and successively laid on top of each other, until the desired thickness of facesheet is obtained.

DESCRIPTION OF THE PREFERRED EMBODIMENTS

The thermal barrier prepared in accordance with the method of this invention employs a honeycomb or foamed ceramic core.

The preferred honeycomb cores of this are grouped as glass-phenolic (HRP type) of various cell sizes and/or densities. Other types such as HRH (glass-polyimide), nylon-phenolic, can be used with minor modifications in surface treatment. The foamed ceramic core employs a alumina-silica insulation that is molded with a ceramic slurry formulation which yields a system about 0.4 thick with a weight of about 3 lb/ft².

Table I sets forth a description of components for thermal barrier systems constructed in accordance with the method of this invention. The code designation F-25, F-26, F-31, and F-35 are used for convenience along with the listing of the average percent of constituents present in the particular material. Also, other abreviations are used for simplicity in describing the construction, for example, 1Q-F-31, means one layer of quartz fabric impregnated with F-31 laminating material. F-31 laminating material is comprised of about 78.6 percent zircon and about 21.4 percent silica. 4Q-F-31, means 4 layers of quartz fabric impregnated with F-31 laminating material. See Table I for additional material and description.

Table II, Example 2 and Example 2A, sets forth the descriptions of preferred embodiments using a honeycomb thermal barrier. Table III, Example 3, sets forth a description of a preferred embodiment using a fiber reinforced ceramic foam thermal barrier. This embodiment illustrates an alternate facing material. In this example the facing materal is comprised of F-26 surface filling comprising 77.3 percent zircon and 22.7 percent silica. As F-26 is applied, the formulation consists of about 80 parts by weight of F-26, about 15 parts by weight of sodium silicate liquid, and about 5 parts by weight water or sufficient water to yield proper viscosity for coating and filling the surface of the cured, coated fiber reinforced ceramic foam block core.

The thermal barriers of this invention employ either a honeycomb system or a foam ceramic system. A detailed description of the construction procedures for a typical system is given below:

I. Raw Materials

A. Honeycombs

These are glass-phenolic (HRP type) of various cell sizes and/or densities. Other types such as HRH (glass-polyimide), nylon-phenolic, can be used with minor modifications in surface treatment.

B. Ceramic Coating (Metalfoam Corporation)

F-25 Ceramic powder — 80 pts. by wt.
H-25 Silicate liquid — 15 pts. by wt.
$H_2O$ Water — 5 pts. by wt.

The viscosity is adjusted by varying amount of water depending upon thickness of coating desired.

NOTE: Other materials such as Metalfoam Corporation F-26 and F-35 could be used.

TABLE I

DESCRIPTION OF COMPONENTS FOR THERMAL BARRIER SYSTEMS

| MATERIAL | DESCRIPTION | INGREDIENTS |
|---|---|---|
| F-25 | Casting mixed oxide ceramic (Metalfoam Inc.) | 90% zircon, 10% silica |
| F-26 | Surface coat ceramic material (Metalfoam Inc.) | 77.3% zircon, 22.7% silica |
| F-31 | Laminating ceramic material (Metalfoam Inc.) | 78.6% zircon, 21.4% silica |
| F-35 | Adhesive ceramic material (Metalfoam Inc.) | 56.2% zircon, 43.8% silica |
| 3/16 HC | Honeycomb core with 3/16 inch cell size (Hexcel Inc.) | (glass-phenolic) HRP type |
| 3/8 HC | Honeycomb core with 3/8 inch cell size (Hexcel Inc.) | (glass-phenolic) HRP type |
| PI | Polyimide resin Sky Guard 707 (Monsanto) | |
| 1Q-F-31 | One layer of quartz fabric impregnated with F-31 laminating material | |
| Glass-PI | One layer of quartz fabric impregnated with Polyimide resin | |

TABLE II

CONSTRUCTION AND PROPERTIES OF HONEYCOMB THERMAL BARRIERS

| Construction and Properties | Example No. 2 | | Example No. 2A | |
|---|---|---|---|---|
| Thermal barrier design | | | | |
| Front facesheet material | 4Q-F-31 | | 4Q-F-31 | |
| Adhesive | F-31 | | F-31 | |
| Insulation material | F-25 coated 3/16 HC | | F-25 coated 3/8 HC | |
| Insulation thickness | 0.5 inch | | 0.4 inch | |
| Adhesive | PI-film | | PI-film | |
| Back facesheet material | Glass-PI | | Glass-PI | |
| 3000°F/90 sec torch heating | | | | |
| Rear surface temperature | Time | Temp | Time | Temp |
| | 90 sec | 470°F | 90 sec | 530°F |
| | 160 sec | 580°F Max | 140 sec | 650°F |
| Weight (lb/ft²) | 2.9 | | 2.7 | |
| Test observations | No apparent deterioration | | No apparent deterioration | |

TABLE III

CONSTRUCTION AND PROPERTIES OF FOAM THERMAL BARRIERS

| Construction and Properties | Example No. 3 | |
|---|---|---|
| Thermal barrier design | | |
| Front facing material | F-26 surface filler | |
| Adhesive | — | |
| Ceramic foam type | Foamed ceramic | |
| Ceramic foam thickness | 0.41 inch | |
| Adhesive | PI film & primer | |
| Back face material | Glass - PI | |
| 3000°F/90 sec torch heating | | |
| Rear surface temperature | Time | Temp |
| | 90 sec | 430°F |
| | 180 sec | 560°F |
| | 385 sec | max |
| Weight (lb/ft²) | 3.0 | |
| Test observations | Very fine cracks in surface filler. No other deterioration. | |

II. Processing

A. Clean and etch the honeycomb. This is accomplished by dipping in hot 5 percent NaOH solution (=200°F) and washing with water (preferably distilled or deionized).

B. Prepare the ceramic mix. Mix by hand until uniform.

C. Place ceramic mix in pan to a depth sufficient to cover all honeycomb to be coated.

D. Dip the cleaned and etched honeycomb (horizontal position) into ceramic mix. Turn honeycomb over 180° and dip into ceramic mix again. Cover entire honeycomb piece on each dip. Core may be dipped as many times as desired — each successive dip results in a heavier coating on the core.

E. Hold ceramic-coated core in a horizontal position and tap bottom side (any flat-type tool) to remove any excess ceramic that may have bridged between the cell walls. Turn over 180° and repeat tapping procedure, if required.

F. Place coated honeycomb on rigid drying racks, in a horizontal position. Turn 180° every few minutes until ceramic hardens and no more flow is evident. Air dry for a minimum of 16 hours, then place in an oven on rigid drying racks. If a shaped honeycomb is desired, use shaped drying forms to which the honeycomb can be clamped. Apply high heat (400°–500°F) with hot air gun rapidly to area to be shaped. Hold and clamp to drying forms. For a sharply contoured honeycomb, shape the honeycomb to forms prior to coating by cutting, grooving, splicing, etc., before applying the ceramic coating. This facilitates the clamping of the honeycomb to shaped drying forms. Note that unshaped honeycomb is difficult to drape. Cure in a hot air circulating oven at 150°F for 2 hours, 350°F for 2 hours, and 400°F for 4 hours.

NOTE: If shaping is required after the oven cure, the coated honeycomb may be reformed by rapid application of high heat (500°–600°F) to the specific area.

The laminated ceramic facesheet is applied to the honeycomb core by conventional wet lay-up techniques used in plastic laminating industry. A wet ceramic slurry is applied to both sides of a high temp resistant fabric such as quartz, silica, carbon, etc., rubbed into the fabric and excess wiped off. The first ply is then laid on top of the honeycomb surface. Additional plies of fabric are impregnated in the same manner and successively laid on top of each other, until the desired thickness of facesheet is obtained.

Just prior to applying the first impregnated ply to the honeycomb, the honeycomb surface is wetted with the same ceramic slurry by running a cloth type roller impregnated with this ceramic slurry over the top surface of the honeycomb that is to be bonded to the facesheet. After the required number of plies are put into position, the entire assembly is prepared for vacuum bag molding by placing bleeder material along the edges of the assembly and placing the entire assembly into a scalable clear plastic bag. After the bag is sealed and evacuated, the ceramic lay-up is rubbed out to remove all air pockets. The part is cured under vacuum for 16 hours at room temperature, then in a hot air circulating oven for 3 hours at 150°F, 2 hours at 250°F, 2 hours at 350°F, and 2 hours at 400°F.

The optimum system contains a 0.4 inch to 0.5 inch thickness of honeycomb core that is coated with the casting material. A polyimide adhesive is used to bond the thermal barrier to the rear glass-polyimide layer.

When the front surface was heated to 3000°F, the rear surface temperature remained below 650°F, which is within the temperature capability of a polyimide substrate. No apparent deterioration of the front surface was observed. This thermal barrier weighs a little less than 3 lb/ft$^2$; and at 3.0 GHz, has a dielectric constant of 1.84 for the ceramic core and 3.95 for the facing sheet.

Foam Systems — The basic design for the foamed ceramic thermal barriers is similar to that of the honeycomb system except that the honeycomb core is replaced by the ceramic foam. Only a 0.4 inch thickness of the reinforced ceramic foam developed for this application and described herein resulted in a maximum rear surface temperature of 560°F (thermal barrier Example No. 3 of Table III). This system weighs about 3 lb/ft$^2$ and has a dielectric constant of about 2.7 at 3 GHz. Construction details for a typical example of the fiber reinforced ceramic foam are given below:

I. Preparation of Ceramic Fibers

A. Raw Materials
1. Water
2. Toluene
3. Ceramic wool insulation ("Kaowool")

B. Equipment
1. Double arm paddle mixer

C. Procedure
1. To a mix of $H_2O$/Toluene (9 pts/1 pt), add ceramic wool insulation slowly and mix for 3 hours.
2. Decant liquid.
3. Place solids in shallow pan and dry in air circulating oven (400°F) till dry.
4. Screen for desired fiber size (through No. 6 on No. 50 screen).

II. Preparation of Mold for Ceramic Foam Block

A. Description of mold — break away type, employing a top mold plate, a bottom mold plate, and metal shim support members for thickness control.
B. Clean and degrease all metal surfaces.
C. Apply back-on Teflon solution (commercial).
D. Bake at recommended temperatures.

III. Ceramic Slurry Formulation

F-31 — 50 percent by wt. (Metalfoam Corp.)
H-31 — 42 percent by wt. (Metalfoam Corp.)
Ceramic fibers — 8 percent by wt. (On 30 mesh size) (alumina-silica insulation)*

*A suitable product is sold as Kaowool which is a trademark for a stable, high-temperature alumina-silica ceramic fiber. Can be used up to 2300°F; M.P. 3200°F; diameter of fibers 2.8 microns; length up to 10 inches. Available in bulk, strip or blanket forms.

A. Mix above proportions by hand mixing and kneading.
B. Put slurry into mold and spread evenly throughout mold to 4/5 of the shim thickness.
C. Place top of mold into position and clamp parts together.
D. Air cure 16 hours at room temperature, 3 hours at 150°F, 2 hours at 250°F, 2 hours at 350°F, and 2 hours at 400°F.
E. Cool to room temperature and disassemble mold to remove ceramic foam block.

I claim:

1. A method for preparation of thermal barriers that employ either a honeycomb core having a predetermined cell size with the honeycomb core being constructed of a reinforced plastic selected from glass-phenolic, glass-polyimide, and nylon-phenolic; or a fiber reinforced ceramic foam block core, said fiber reinforced ceramic foam block core formed by molding and curing a ceramic slurry formulation composed of 50 percent by weight of a laminate ceramic powder containing 77.3 percent by weight zircon and 22.7 percent by weight silica, 42 percent by weight of sodium silicate liquid, and 8 percent by weight of alumina-silica ceramic reinforcing fibers, said alumina-silica ceramic reinforcing fibers having a diameter of about 2.8 microns and having random lengths that are retained on 30 mesh size screen, said fibers being prepared for use by mixing for about 3 hours with a water/toluene solution containing 9 parts water and 1 part toluene, followed by decanting the solution, and drying the fibers in air circulating oven at 400°F until dry, said curing of ceramic slurry formulation being accomplished by air curing 16 hours at room temperature, 3 hours at 150°F, 2 hours at 250°F, 2 hours at 350°F, 2 hours at 400°F, said method for preparation of thermal barriers comprising:

i. providing said honeycomb core or said fiber reinforced ceramic foam block core and preparing the surface thereof by cleaning and etching which is accomplished by cleaning and etching in hot 5 percent sodium hydroxide solution of about 200°F and followed by washing with distilled or deionized water;

ii. dipping said honeycomb core or said fiber reinforced ceramic foam block core in a ceramic mix slurry composed of 80 parts by weight of casting mixed oxide ceramic containing 90 percent zircon and 10 silica, 15 parts by weight of sodium silicate liquid, and sufficient quantity of water in amount of 5 parts or more to adjust viscosity of ceramic mix to enable a thin uniform coating to be applied during said dipping, repeat said dipping while said honeycomb core or said film reinforced ceramic foam block core is turned over 180° to achieve complete coverage, and then while holding said honeycomb core or said reinforced ceramic foam block core in a horizontal position, tapping said core to remove any excess ceramic mix;

iii. placing said coated honeycomb core or said fiber reinforced ceramic foam block core in a horizontal position or a rigid drying rack and turn 180° every few minutes until said ceramic mix hardens and no more flow is evident and then air drying at room temperature for a minimum of 16 hours;

iv. clamping said air dried, coated honeycomb core or said air dried, coated fiber reinforced ceramic foam block core to drying forms after first applying high heat of 400°–500°F with hot air gun rapidly to any area to be shaped, and then placing said drying form with said clamped, air dried, coated honeycomb core or said clamped, air dried, coated fiber reinforced ceramic foam block core in a hot air circulating oven and curing for 2 hours at 150°F, 2 hours at 250°F, 2 hours at 350°F, and 4 hours at 400°F, and allowing to cool to room temperature;

v. completing a laminating procedure for the top surface to form a front facesheet for said cured, coated honeycomb core or said cured, coated fiber reinforced ceramic foam block core by first wetting the top surface with said ceramic mix slurry, and then applying said ceramic mix slurry to each surface of a quartz fabric and rubbing the slurry into said quartz fabric to impregnate said quartz fabric with said slurry and then wiping the excess slurry off, and subsequently, laying a first ply of the impregnated quartz fabric on the top surface of said cured. coated, honeycomb core or said cured, coated, fiber reinforced ceramic foam block core, and repeating said laminating procedure until at least four piles of impregnated quartz fabric are laid onto form an uncured front facesheet on the thermal barrier assembly;

vi. preparing said thermal barrier assembly for vacuum bag molding and curing said thermal barrier assembly under vacuum for 16 hours at room temperature, then in a hot air circulating oven for 3 hours at 150°F, 2 hours at 250°F, 2 hours at 350°F, 2 hours at 400°F, and then allowing said thermal barrier assembly to cool to room temperature and then removing the thermal barrier assembly; and thereafter, vii. providing a back facesheet for the rear surface of said thermal barrier assembly which comprises attaching a glass-polyimide laminate to said rear surface with an adhesive selected from a polyimide-film adhesive and a ceramic adhesive.

2. The method of claim 1 wherein said laminating procedure employs four plies of said impregnated quartz fabric in forming said facesheet on the top surface of said cured, coated honeycomb core and wherein said glass-polyimide laminate is comprised of one layer of quartz fabric impregnated with a polyimide resin that is attached to said rear surface with a polyimide-film adhesive, and wherein said honeycomb core has a predetermined cell size of about three-eighths inch and wherein said honeycomb is constructed of a reinforced plastic selected from glass-phenolic.

3. A thermal barrier prepared in accordance with the method as set forth in claim 2 and wherein said thermal barrier has a thickness from about 0.4 inch to about 0.5 inch with said front facesheet being about 0.06 inch thick and with said back facesheet being about 0.015 inch thick, said thermal barrier characterized by having a weight of about 2.7 to about 2.9 pounds per square foot and having a dielectric constant of about 1.84 at 3 GHz for the honeycomb core and having a dielectric constant of about 4.0 at 3 GHz for the front facesheet.

4. The method of claim 1 wherein said laminating procedure employs four plies of said impregnated quartz fabric in forming said facesheet on the top surface of said cured, coated fiber reinforced ceramic foam block core and wherein said glass-polyimide laminate is comprised of one layer of quartz fabric impregnated with a polyimide resin that is attached to said rear surface with a polyimide-film adhesive.

5. A thermal barrier prepared in accordance with the method as set forth in claim 4 and wherein said thermal barrier has a thickness from about 0.4 inch to about 0.5 inch thick with said front facesheet being about 0.06 inch thick and with said back facesheet being about 0.015 inch thick, said thermal barrier characterized by a weight of about 3 pounds per square foot and having a dielectric constant of about 2.7 at 3 GHz.

* * * * *

UNITED STATES PATENT OFFICE
CERTIFICATE OF CORRECTION

PATENT NO. : 3,930,085
DATED : December 30, 1975
INVENTOR(S) : Walter T. Pasiuk

It is certified that error appears in the above-identified patent and that said Letters Patent are hereby corrected as shown below:

In Column 1, line 20, "for" should be --or--;
line 24, after "along" should be --with--; and
line 47, "resistance" should be --resistant--.

In Column 2, line 3, after "consists of" should be --a--;
line 6, after "silica, no beginning parenthetical mark should appear; and
line 6, "by which" should be --by weight--.

Column 7, line 30, after position, "or" should be --on--.

Column 8, line 2, "piles" should be --plies--; and
line 3, after laid, "onto" should be --on to--.

Signed and Sealed this eleventh Day of May 1976

[SEAL]

Attest:

RUTH C. MASON
Attesting Officer

C. MARSHALL DANN
Commissioner of Patents and Trademarks